United States Patent [19]
McCreath

[11] 3,844,714
[45] Oct. 29, 1974

[54] METHOD OF IMPROVING SHAPED FIBRE FORMING POLYMERS

[75] Inventor: Michael King McCreath, Harrogate, England

[73] Assignee: Imperial Chemical Industries Limited, London, England

[22] Filed: Feb. 8, 1973

[21] Appl. No.: 330,562

Related U.S. Application Data

[63] Continuation of Ser. No. 806,032, March 5, 1969, abandoned, which is a continuation of Ser. No. 424,823, Jan. 11, 1965, abandoned.

[52] U.S. Cl............................ 8/168, 8/100, 8/DIG. 3
[51] Int. Cl................................................ D06p 5/00
[58] Field of Search ............ 8/31, 100, DIG. 3, 168, 8/163

[56] References Cited
UNITED STATES PATENTS

| | | | |
|---|---|---|---|
| 3,083,118 | 3/1963 | Bridgeford | 8/194 X |
| 3,227,510 | 1/1966 | Bridgeford | 8/100 X |
| 3,274,294 | 9/1966 | Stanton et al. | 8/168 X |
| 3,284,541 | 11/1966 | Stanton et al. | 8/168 X |
| 3,432,250 | 3/1969 | Miller et al. | 8/100 X |

*Primary Examiner*—Leland A. Sebastian
*Assistant Examiner*—P. A. Nelson
*Attorney, Agent, or Firm*—T. J. Morgan; Robert J. Blanke

[57] ABSTRACT

The acid dyeability of extruded fibre-forming polyesters, particularly polyethylene terephthalate, is improved by incorporating within the polymer a vinylpyridine by diffusion and polymerizing the vinylpyridine in situ by treating with a polymerization catalyst.

1 Claim, No Drawings

METHOD OF IMPROVING SHAPED FIBRE FORMING POLYMERS

This invention, which is a Continuation of copending application Ser. No. 806,032, now abandoned, Filed Mar. 5, 1969, which is a Continuation of application Ser. No. 424,823, filed Jan. 11, 1965, now abandoned, relates to a method of improving the acid dyeability of fibre-forming polyesters, particularly of polyesters based on terephthalic acid, and which have been shaped.

Hydrophobic polyesters which do not contain basic groups do not readily dye with dyes containing sulphonic acid groups, such as dyestuffs of the classes commonly referred to as acid wool dyes, direct cotton dyes and soluble reactive dyes.

Several suggestions for improving the acid dyeability of fibre-forming polyesters, particularly of polyethylene terephthalate, have been put forward comprising incorporating various amines.

We have now found that synthetic fibre-forming polyesters, for instance poly(ethylene terephthalate) can be rendered dyeable with acid dyestuffs by incorporating within the polymer a vinylpyridine by diffusion and then polymerizing the vinylpyridine by treating with a suitable polymerization catalyst.

According to our invention, therefore, we provide a film and fibre-forming synthetic polyester which has been shaped by an extrusion technique, comprising treating the shaped polyester with a vinylpyridine under conditions to diffuse the vinylpyridine into the polyester followed by a catalytic treatment to polymerize the vinylpyridine to such a degree that diffusion out of the shaped polyester is inhibited.

Suitable vinylpyridines are 2 - vinylpyridine and 4 - vinylpyridine. Suitable catalysts for the polymerization of the vinylpyridines comprise those which are suitable for the polymerization of vinyl compounds, for example boron trifluoride etherate, benzoyl peroxide, peracetic acid, ultraviolet irradiation, and azodiisobutyronitrile. The vinylpyridine is diffused into the polymer after shaping by an extrusion technique when the polymer is in the form of a filament, fibre, yarn, fabric or film. Because of the relatively small molecular weight of vinylpyridine, diffusion and penetration even on the oriented shaped polymer articles can be obtained; the vinylpyridine within the fibre can then be polymerized readily by heating in the presence of suitable catalyst.

The following examples illustrate but do not limit our invention.

EXAMPLE 1

A poly(ethylene terephthalate) taffeta fabric was heated in 2-vinylpyridine at 100° C. for 30 minutes, washed in methanol, and heated for a further 20 minutes in boron trifluoride etherate at 80° C. The fabric was washed again in methanol and then dyed to a deep shade of blue in a dyebath containing "Carbolan" (Registered Trade Mark) Blue BS (C.I. Acid Blue 138,139) (0.1 percent), acetic acid (1 percent) and O-phenylphenol (0.5 percent), for 1 hour at the boil.

The proportion of involatile polyvinylpyridine present in the fibre after treatment was estimated by weighing the fabric, heat-treating at 180° C. for 1 hour and reweighing. No loss in weight was detected when the treatment of fabric was carried out in the manner described in the above example.

EXAMPLE 2

Undrawn 3-filament polyethylene terephthalate yarn was passed through a bath containing 2-vinylpyridine and 0.1 percent (by weight of 2-vinylpyridine) benzoin and drawn over a hot pin at 85° C. and plate at 165° C. to a draw ratio of 3.5:1. The drawn yarn was then irradiated 4 inches from a 150 w. ultra-violet lamp for 1 hour. The resultant yarn dyed to a deep red shade in a dyebath containing Nylomine Red 2G (Color Index Acid Red 266) (0.1g.) acetic acid (1g.), o-phenylphenol (0.5g.) water (100 ml.) at the boil for 1 hour.

A sample of yarn which had been treated with 2-vinylpyridine and benzoin in this way but not irradiated with ultra-violet light dyed to a less intense shade of red under the dyebath conditions described above.

EXAMPLE 3

A 306-filament undrawn polyethylene terephthalate tow was passed through a bath containing 2-vinylpyridine and 0.1 (by wt. of vinylpyridine)$\gamma,\gamma$-azodiisobutyronitrile and then drawn over a pin at 110° C. and plate at 120° C. to a draw ratio of 3.5 to give a flat cohered ribbon of tenacity 0.5g./denier and extensibility 6 percent.

A 2g. hank of yarn dyed to a deep shade of red under the following dyebath conditions:

Nylomine Red 2G (color index acid red 266) 0.1g., acetic acid (1g.) and water 100 ml. at the boil for 1 hour.

EXAMPLE 4

A hank of polyethylene terephthalate (Registered Trade Mark) drawn yarn was immersed in 2-vinylpyridine at 100° C. for 30 minutes, rinsed in methanol and then treated with boron trifluoride etherate at 80° C. for 20 minutes. The treated yarn, which contained 5 percent basic amine additive, was dyed to a deep red shade in the dyebath described in Example 2 above for 2 hours at the boil. A study of the cross-section of the fibre showed complete penetration of the dye and no evidence of ring-dyeing.

EXAMPLE 5

Undrawn 3-filament polyethylene terephthalate yarn was passed through a bath containing 2-vinylpyridine and 0.5 percent (by weight of 2-vinylpyridine) $\gamma,\gamma$-azodiisobutyronitrile and then drawn over a pin at 85° C. and plate at 150° C. to a draw ratio of 3.5:1. The resultant yarn dyed to deep shades with the following dyes in dyebaths containing dye (0.1g.), acetic acid (1g.), o-phenylphenol (0.5g.), water (100 ml.) at the boil for one hour.:

Lissamine (Registered Trade Mark) Flavine FF (C.I. acid yellow 7).

Naphthalene Orange GS (C.I. Acid Orange 7).

Nylomine (Registered Trade Mark) Red 2BS (C.I. Acid Red 266).

Lissamine (Registered Trade Mark) Green VS (C.I. Acid Green 16).

Carbolan (Registered Trade Mark) Blue BS (C.I. Acid Blue 138,139).

Solway (Registered Trade Mark) Purple R (C.I. Acid Violet 43).

i. Cross-section photomicrographs of dyed samples have shown uniformity of dyeing indicating even distribution of the polyvinylpyridine.

ii. Trace amounts of catalyst will remain in the fibre after polymerization of the additive has occurred since they initiate the reaction by forming chemical compounds with the olefinic monomer and are therefore present as end groups.

What is claimed is:

1. A process for improving the dyeability of meltspun polyethylene terephthalate which is in the form of a fiber, filament, yarn or fabric, comprising passing undrawn polyethylene terephthalate filamentary extrudate through a bath containing vinylpyridine and benzoin, said vinylpyridine being selected from the group consisting of 2-vinylpyridine and 4-vinylpyridine said vinyl pyridine thereby being caused to diffuse uniformly into the polyethylene terephthalate filamentary extrudate, drawing the polyethylene terephthalate filamentary extrudate over a heated member and then polymerizing the vinylpyridine, in situ, to a degree such that diffusion out of the polyethylene terephthalate filamentary extrudate is inhibited, the polymerizing step being effected by treating the polyethylene terephthalate filamentary extrudate which contains the vinylpyridine, with a catalyst selected from the group consisting of boron trifluoride etherate, benzyl peroxide, peracetic acid, azodiisobutyronitrile and ultra-violet radiation.

* * * * *